(12) United States Patent
Righetti (10) Patent No.: US 8,579,326 B2
(45) Date of Patent: Nov. 12, 2013

(54) LANDING GEAR

(75) Inventor: Valter Righetti, San Benedetto Po (Mantova) (IT)

(73) Assignee: Simol S.p.A., Luzzara (Reggio Emilia) (IT)

(*) Notice: Subject to any disclaimer, the term of this patent is extended or adjusted under 35 U.S.C. 154(b) by 110 days.

(21) Appl. No.: 13/388,747

(22) PCT Filed: Jul. 22, 2010

(86) PCT No.: PCT/EP2010/060667
§ 371 (c)(1),
(2), (4) Date: Feb. 3, 2012

(87) PCT Pub. No.: WO2011/015467
PCT Pub. Date: Feb. 10, 2011

(65) Prior Publication Data
US 2012/0126520 A1    May 24, 2012

(30) Foreign Application Priority Data
Aug. 4, 2009  (IT) .............................. RE2009A0082

(51) Int. Cl.
*B60S 9/02*    (2006.01)
(52) U.S. Cl.
USPC .................... 280/766.1; 280/425.1; 280/475; 254/419; 254/424; 254/425; 254/418
(58) Field of Classification Search
USPC ................. 280/425.1, 431, 475, 763.1–766.1
See application file for complete search history.

(56) References Cited

U.S. PATENT DOCUMENTS

| 3,760,906 | A  | * | 9/1973  | McGee ........................ 188/4 R |
| 5,238,266 | A  |   | 8/1993  | VanDenberg |
| 6,099,016 | A  | * | 8/2000  | Peveler ........................ 280/475 |
| 6,623,035 | B1 | * | 9/2003  | Schneider .................. 280/766.1 |
| 6,846,016 | B2 | * | 1/2005  | VanDenberg et al. ..... 280/763.1 |
| 7,055,859 | B2 | * | 6/2006  | Peveler ...................... 280/766.1 |
| 7,152,848 | B2 | * | 12/2006 | Pfleging et al. .............. 254/419 |
| 7,207,599 | B2 | * | 4/2007  | Belliveau ................... 280/766.1 |
| 7,380,825 | B2 | * | 6/2008  | Peveler ...................... 280/766.1 |
| 8,276,941 | B2 | * | 10/2012 | Riedl .......................... 280/766.1 |
| 8,388,023 | B2 | * | 3/2013  | Birkholz et al. ........... 280/763.1 |
| 2001/0020781 | A1 |   | 9/2001 | VanDenberg |

(Continued)

FOREIGN PATENT DOCUMENTS

| CA | 2659294 A1  | 2/2008 |
| DE | 19616704 A1 | 10/1997 |
| EP | 1350701 A2  | 10/2003 |

*Primary Examiner* — Jeffrey J Restifo
*Assistant Examiner* — Erez Gurari
(74) *Attorney, Agent, or Firm* — Volpe and Koenig, P.C.

(57) ABSTRACT

An extensible support leg includes at least two reciprocally-slidable portions, a maneuvering screw axially constrained to a first portion, a threaded volute axially constrained to a second portion and screwed on the maneuvering screw, and a rotating drive shaft which is connected to the maneuvering screw by a mechanical gear change, and is rotatable to set the maneuvering screw in rotation. The mechanical gear change includes: two first cogged crown wheels, coaxial and rotatably solid with the maneuvering screw; two second cogged crown wheels mounted coaxially and rotatably idle on the drive shaft, which enmesh directly with a respective first cogged crown wheel, realizing two gears having different transmission ratios; and a cursor, which is solidly rotatably associated to a portion of the drive shaft between the second cogged crown wheels, and is mobile, in a direction of the drive shaft axis, between first and second enmeshed positions.

9 Claims, 4 Drawing Sheets

(56) References Cited

U.S. PATENT DOCUMENTS

| | | | |
|---|---|---|---|
| 2003/0006599 A1* | 1/2003 | VanDenberg et al. | 280/766.1 |
| 2003/0168648 A1* | 9/2003 | Alguera Gallego et al. | 254/419 |
| 2007/0182149 A1* | 8/2007 | Belliveau | 280/766.1 |
| 2008/0224113 A1* | 9/2008 | Muller et al. | 254/419 |
| 2008/0315570 A1* | 12/2008 | Baxter | 280/766.1 |
| 2009/0057633 A1* | 3/2009 | Beck et al. | 254/420 |
| 2010/0164213 A1* | 7/2010 | Riedl | 280/766.1 |
| 2011/0057430 A1* | 3/2011 | Riedl | 280/766.1 |
| 2011/0115205 A1* | 5/2011 | Riedl | 280/766.1 |
| 2011/0266784 A1* | 11/2011 | Riedl | 280/763.1 |
| 2011/0272931 A1* | 11/2011 | Christ | 280/763.1 |
| 2012/0126520 A1* | 5/2012 | Righetti | 280/766.1 |

* cited by examiner

LANDING GEAR

TECHNICAL FIELD

The invention relates to support legs which are normally fitted to trailers, construction machines, agricultural machines, industrial vehicles, transport carriages or any type of vehicle to enable stable support thereof on the ground when the machine is stationary.

In particular, the present invention relates to extensible support legs which can take on a shortened configuration, in which the lower end thereof is raised from the ground, and an extended configuration, in which the lower end thereof rests on the ground.

BACKGROUND ART

As is known, extensible support legs schematically comprise a telescopic column which is fixed to the vehicle, and a contact organ which is fixed to the lower end of the telescopic column.

The contact organ is generally a platform or a small wheel.

The telescopic column comprises at least two coaxial tubes, of which one is an external tube and another is an internal tube which is slidably inserted in the external tube.

The contact organ is fixed to the lower end of the internal tube which projects from the external tube.

The lengthening and shortening of the telescopic column are obtained by a manoeuvring screw which is inserted in the coaxial tubes.

The manoeuvring screw is axially constrained to the external tube, and is screwed into a threaded volute axially constrained to the internal tube.

Thanks to this solution, the rotation of the manoeuvring screw causes an axial sliding of the internal tube in an upwards direction or in a downwards direction.

In the type of support leg the present invention particularly relates to, the rotation of the manoeuvring screw is activated by a drive shaft.

The drive shaft is connected to the manoeuvring screw by an intermediate gear and is rotated by a motor or a manually-activated handle.

When the vehicle is to be stabilised on the ground, the telescopic column is extended up to when the contact organ rests on the ground, after which it is further extended such as to raise and support at least part of the load.

In order to reduce the torque that is it necessary to apply in the second extending stage, with the aim for example of reducing the power of the motor or the operator's exertion if there is a manually-operated handle, or raising a given load with a given maximum torque applicable on the handle, an intermediate gear can be used for realising a rather high transmission ratio between the drive shaft and the manoeuvring screw.

The greater the transmission ratio of the intermediate gear, the greater the number of revolutions required on the drive shaft in order for the internal tube to slide in the external tube by a given quantity.

This fact can represent a drawback, as it means in particular that the first stage of extension of the telescopic column, i.e. the stage which is necessary for resting the contact organ on the ground, can become an extremely slow operation.

To obviate or at least reduce this drawback, a known solution is to interpose a mechanical gear change between the drive shaft and the manoeuvring screw, which can produce at least two different transmission ratios.

For example, patent application CA 2 659 294 illustrates a support leg with a mechanical gear change that comprises two gears with a different transmission ratio. Each of the gears comprises a first cog wheel mounted on the drive shaft, which enmeshes with a second cog wheel mounted on an intermediate shaft, and a third cog wheel mounted on the intermediate shaft, which in turn enmeshes with a fourth cog wheel mounted on the manoeuvring screw. The first cog wheel of each gear is rotatably idle on the drive shaft, which is axially mobile, in order to activate an enmeshing system which renders it rotatably solid with the first cog wheel of one or the other gear.

US patent 2008/0315570 describes a support leg having a mechanical gear change which also comprises an intermediate shaft, kinematically interposed between the drive shaft and the manoeuvring screw. The intermediate shaft is connected to the manoeuvring screw via a single gear, while it is connected to the drive shaft via two further gears having different transmission ratios. In this case too, the drive shaft is axially mobile in order to activate an enmeshing system which renders one or the other of the further gears active.

EP patent EP 1 350 701 also describes a mechanical gear change provided with an intermediate shaft, which is connected to the drive shaft by means of two gears with a different transmission ratio, selectively activatable by means of an enmeshing system, while it is connected to the manoeuvring screw by a single gear with a fixed transmission ratio.

The same constructive principle is also described in U.S. Pat. No. 5,238,266, which illustrates a support leg the gear change of which comprises an intermediate shaft which is constantly connected to the manoeuvring screw by means of a single gear. The drive shaft can be axially displaced between a position in which it is directly coupled to the intermediate shaft, or in a position in which it is connected to the intermediate shaft by means of a reducer group.

US patent application US 2001/020781, in the name of the same inventor as the previous patent, describes a constructional variant of the same solution.

Finally, German patent application DE 196 16 704 describes a support leg of traditional type, wherein the manoeuvring screw is connected to an intermediate shaft by means of a fixed gear, while the intermediate shaft is connected to the drive shaft by means of a gear change which is housed in a box located externally of the support leg.

All the known solutions have in common the fact of comprising a gear change which comprises an intermediate transmission shaft, kinematically interposed between the manoeuvring screw and the drive shaft.

Though providing good results, these solutions require the use and mounting of numerous mechanical components and cog wheels, making the gear change rather complicated to realise, as well as expensive.

Further, the gear changes realised in the above known solutions are very unwieldy, and increase the overall dimensions of the support leg, which obviously makes a larger space necessary for mounting thereof on-board vehicles.

An aim of the present invention is to make available a support leg with a gear change that is simpler, more compact and less expensive in relation to the known solutions, but which is equally functional and effective.

A further aim is to provide a gear change which is in any case able to effectively limit the torque to be applied to the drive shaft in the second extension stage of the support leg, during which the load is raised, guaranteeing however a sufficient rapidity of the first stage of extension during which the contact organ is neared to the ground.

A further aim of the invention is to reach the above-mentioned objective in the ambit of a simple, rational and relatively inexpensive solution.

DISCLOSURE OF INVENTION

These aims are attained by the characteristics of the invention as reported in independent claim 1. The dependent claims delineate preferred and/or particularly advantageous aspects of the invention.

In particular, an extensible support foot is provided which overall comprises at least two reciprocally-slidable portions, a manoeuvring screw axially constrained to a first of the portions, a threaded volute axially constrained to a second of the portions and screwed on the manoeuvring screw, and a rotating drive shaft, which is connected to the manoeuvring screw by means of a mechanical gear change, and is destined to be rotated in order to rotate in turn the manoeuvring screw, such as to cause a reciprocal sliding of the first and second portions.

According to the invention, the gear change comprises at least:

two first cogged crown wheels, coaxial and rotatably solidly with the manoeuvring screw;

two second cogged crown wheels mounted coaxially and rotatably idle on the drive shaft, each of which enmeshes directly with a respective cogged crown wheel of the first cogged crown wheels, such as to realise two gears having different transmission ratios, and a cursor, which is rotatably solidly associated to a portion of the drive shaft comprised between the second cogged crown wheels, and is mobile, in a direction of the axis of the drive shaft, between a first enmeshed position and a second enmeshed position, in which the drive shaft is rotatably solid respectively with one of the second cogged crown wheels and with the other.

Thanks to this solution, no intermediate shaft is necessary between the drive shaft and the manoeuvring screw, thus considerably simplifying the realisation of the gear change, which is therefore more economical and compact with respect to all the solutions at present known in the prior art.

Thanks to this gear change it is, of course, possible to set at least two different transmission ratios between the drive shaft and the manoeuvring screw.

The lower transmission ratio can be used in the first stage of extension of the support leg, such as to reduce the revolutions of the drive shaft required, and therefore the time needed in order to bring the support organ to the ground.

The higher transmission ratio can be used in the second stage of extension of the support leg, such as to minimise the torque to be applied to the drive shaft in order to obtain the raising of the load.

Following this, the higher gear ratio can also be used in the first retracting stage of the support leg, during which the load bearing down on the support leg is gradually lowered, while the lower transmission ratio can be re-used during the second retraction stage of the support leg, during which the contact organ is raised into the initial position.

In an aspect of the invention, the support leg comprises exactly one rotating shaft alone, connected in a kinematic mechanism with the manoeuvring screw, the rotating shaft being the above-mentioned drive shaft.

This makes the support leg very compact, simple and economical.

In a further aspect of the invention, the cursor of the gear change is axially blocked on the drive shaft, which is mobile in the direction of the axis thereof such as to move the cursor between the enmeshed positions.

Thanks to this solution, the gear change can be manually activated by a user, simply by rotating and moving the drive shaft in an axial direction.

In a further aspect of the invention, the cursor exhibits opposite lateral sides, each of which is provided with at least a frontal cog destined to couple with at least a frontal cog of the second cogged crown wheel facing it, in order to enmesh there-with.

This solution has the advantage of providing an enmeshing system which is very simple and reliable.

In a further aspect of the invention, the first cogged crown wheels, associated to the manoeuvring screw, are made in a single body.

This solution reduces the number of components, and simplifies the mounting of the gear change.

However the first cogged crown wheels can also be made in two separate bodies.

In a further aspect of the invention, the support leg also comprises a handle destined to be manually activated in order to set the drive shaft in rotation.

The handle can be made in a single body with the drive shaft or can be realised separately and mounted thereon.

In an alternative embodiment of the invention, the drive shaft could be connected to a motor destined to set it in rotation.

Further, the cursor could be associated to automatic means for moving it between the enmeshed positions.

In this way, the functioning of the gear change would be entirely automatic and even remotely activatable.

BRIEF DESCRIPTION OF DRAWINGS

Further characteristics and advantages of the invention will emerge from a reading of the following description provided by way of non-limiting example, with the aid of the figures illustrated in the accompanying tables of drawings.

BEST MODE FOR CARRYING OUT THE INVENTION

The support leg 1 is destined to be mounted on trailers, construction machines, agricultural machines, industrial vehicles, transport carriages or any other type of vehicle, in order to enable a stable rest on the ground when stationary and/or unhooked from the drive shaft.

The support leg 1 comprises a vertical-axis telescopic column 2, at a lower end of which a platform 3 is fitted, which platform 3 is destined to be rested on the ground.

The platform 3 can be replaced by any other contact organ, for example a wheel.

The telescopic column 2 comprises two coaxial tubes, of which one is an external tube 20 and another an internal tube 21, which is slidably inserted in the external tube 20.

The coaxial tubes 20 and 21 both have prismatic transversal sections (see for example FIGS. 4 and 5), such that they can reciprocally slide in an axial direction but which are reciprocally blocked in rotation.

Obviously the coaxial tubes 20 and 21 might have a circular transversal section. The platform 3 is welded to the lower end of the internal tube 21 which projects from the external tube 20.

Figure 1:
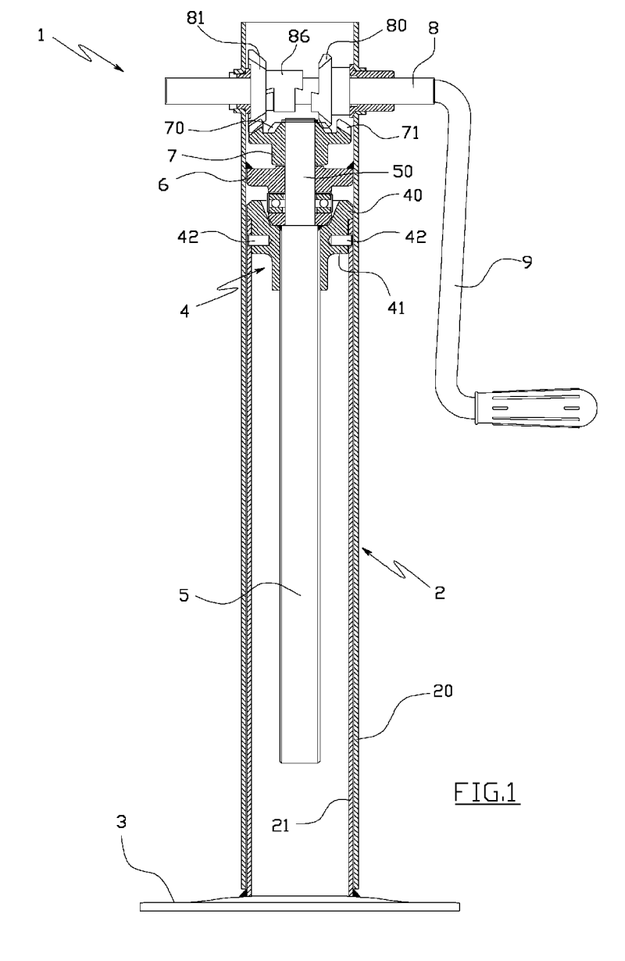
FIG. 1 is a front view in vertical section of a support leg of the invention.

The external tube 20 is destined to be fixed on the vehicle, such that the internal tube 21 can slide between the retracted position of FIG. 1, in which the platform 3 is raised from the ground, and an extracted position (not illustrated), in which the platform 3 rests on the ground.

Figure 2:
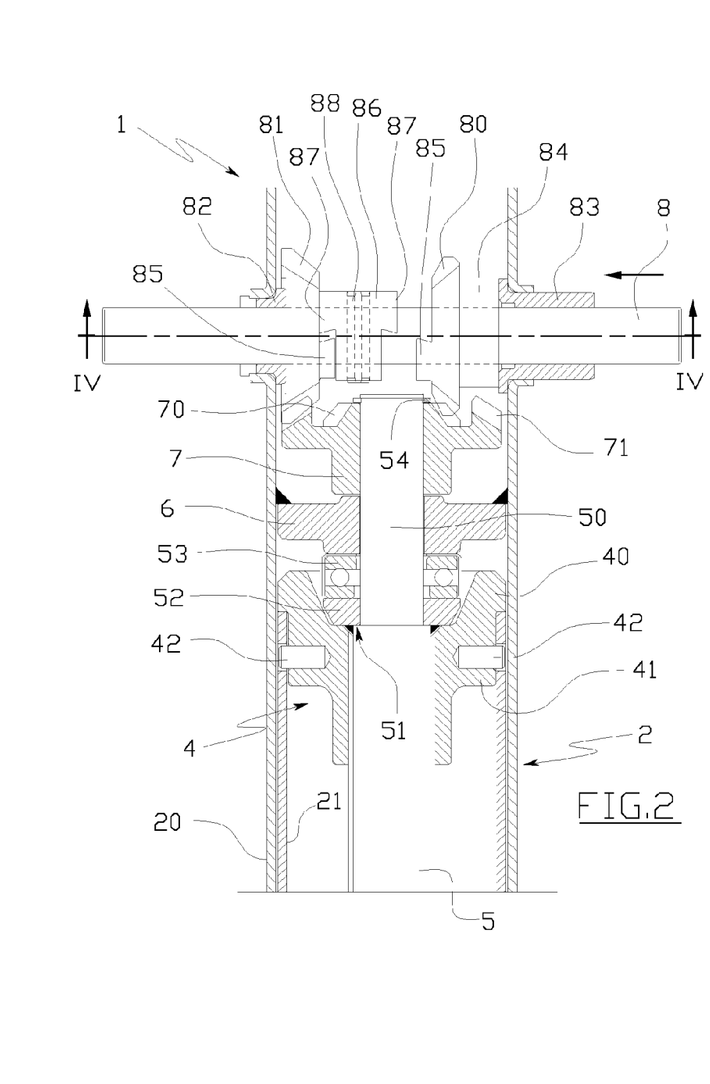
FIG. 2 is a detail of the support leg of FIG. 1 in enlarged scale.
Figure 3:
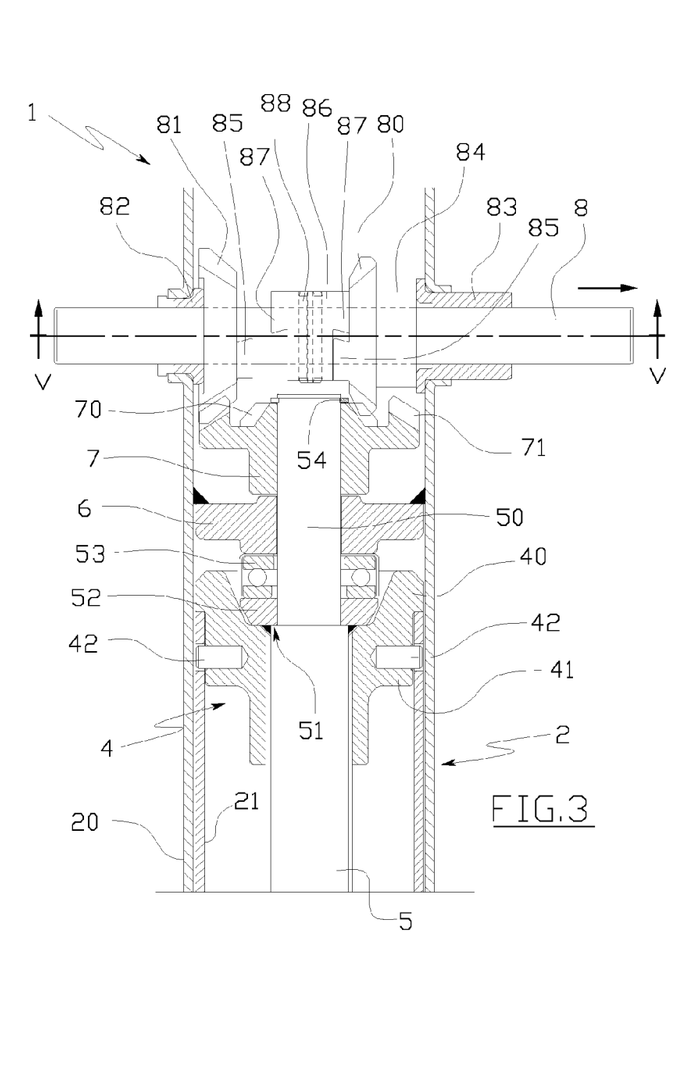
FIG. 3 is the detail of FIG. 2 illustrated with the gear change in a different configuration.

As illustrated in FIGS. 2 and 3, a threaded volute 4 is fixed to the upper end of the internal tube 21.

The threaded volute 4 comprises an upper shoulder 40 which rests on the edge of the internal tube 21, and a lower portion 41 which is jointed internally of the internal tube 21.

The threaded volute 4 is further fixed to the internal tube 21 by two transversal pins 42, each of which is inserted in a respective hole afforded in the lower portion 41 from which each pin 42 projects with a head tract thereof that is engaged in a hole afforded in the internal tube 21.

In this way, the threaded volute 4 is solidly constrained to the internal tube 21 axially, and cannot even rotate about the vertical axis thereof.

A vertical-axis manoeuvring screw 5 is screwed into the threaded volute 4, which screw 5 is coaxially inserted internally of the external tube 20 and the internal tube 21.

As illustrated in FIGS. 2 and 3, the upper end of the manoeuvring screw 5 comprises a coaxial cylindrical spur 50 which projects above the threaded volute 4.

The cylindrical spur 50 has a smaller diameter than the manoeuvring screw 5, such that a striker abutment 51 remains defined there-between.

The cylindrical spur 50 is inserted in a through-hole afforded centrally in a plate 6 which is welded internally of the external tube 20.

An annular spacer 52, resting on or welded to the striker abutment 51, and a thrust bearing 53, in contact with bother the annular spacer 52 and the plate 6, are inserted on a tract of the cylindrical spur 50 comprised between the plate 6 and the manoeuvring screw 5.

A gear wheel 7 is constrained on the tract of the cylindrical spur 50 projecting above the plate 6, which gear wheel 7 rotates solidly with the manoeuvring screw 5.

The gear wheel 7, the plate 6, the thrust bearing 53 and the annular spacer 52 are blocked in a stack between the striker abutment 51 of the manoeuvring screw 5 and an elastic seeger ring 54, or another retaining system, which is fixed to the end of the cylindrical spur 50.

In this way, the manoeuvring screw 5 is axially constrained to the external tube 20, and is free to rotate about the vertical axis thereof, solidly with the gear wheel 7.

The gear wheel 7 comprises two conical cogged crown wheels, reciprocally coaxial and having the cogs thereof facing upwards, of which one is an internal cogged crown wheel 70 and the other is an external cogged crown wheel 71.

Each cogged crown wheel 70 and 71 enmeshes with a horizontal-axis cogged crown wheel, respectively with a first gear wheel 80 and a second gear wheel 81.

The transmission ratio realised between the first gear wheel 80 and the internal cogged crown wheel 70 is greater than the transmission ratio realised between the second gear wheel 81 and the external cogged crown wheel 71.

In the illustrated embodiment, the transmission ration between the first gear wheel 80 and the internal cogged crown wheel 70 is greater than 1 (one), as the primitive diameter of the gear wheel 80 is greater than the primitive diameter of the cogged crown wheel 70, such that they have a multiplication ratio in which for each complete revolution of the gear wheel 80 the gear wheel 7 performs more than one complete revolution.

The transmission ratio between the second gear wheel 81 and the external cogged crown wheel 71 has a minimum value of 1 (one), as the primitive diameter of the gearwheel 81 is less than the primitive diameter of the cogged crown wheel 71, such that they have a reduction ratio such that for each complete revolution of the gearwheel 81 there is less than a complete revolution of the gear wheel 7.

The gear wheels 80 and 81 are coaxially inserted idle on a same rotating horizontal-axis drive shaft 8, which is inserted and maintained in two reciprocally-aligned through-holes afforded in the lateral walls of the external tube 20.

Plastic bushings 82 and 83 are interposed between the drive shaft 8 and each through-hole of the external tube 20, which plastic bushings reduce rotation friction.

In some embodiments the plastic bushings 82 and 83 can be absent.

The drive shaft 8 is free to slide axially with respect to the gear wheels 80 and 81, which are axially stationary such as to constantly enmesh with the respective cogged crown wheels 70 and 71.

In particular, the gear wheel 81 is axially blocked between the bush 82 and the cogged crown wheel 70, while the gear wheel 80 is axially blocked between the cogged crown wheel 71 and the bush 83 with the interposing of a spacer 84.

Note that since the gear wheels 80 and 81 are coaxial but arranged on diametrically opposite sides with respect to the rotation axis of the manoeuvring screw 5; the gear wheels 80 and 81 are destined always to rotate in opposite directions.

Each gear wheel 80 and 81 further comprises one or more frontal cogs 85 which project from the surface facing towards the other gear wheel.

An annular cursor 86 is inserted on the tract of the drive shaft 8 comprised between the gear wheels 80 and 81, opposite lateral flanks of which annular cursor 86 both comprise one or more frontal cogs 87 destined to cooperate with the frontal cogs 85 of the gear wheel 80 or 81, such as to realise an enmeshing which constrains the gear wheel 80 and 81 to the annular cursor 86 in rotation.

The annular cursor 86 is axially and rotatingly solidly constrained to the drive shaft 8 by means of a transversal elastic plug 88, which is snugly inserted in a corresponding through-hole 89 passing through the drive shaft 8.

Figure 4:
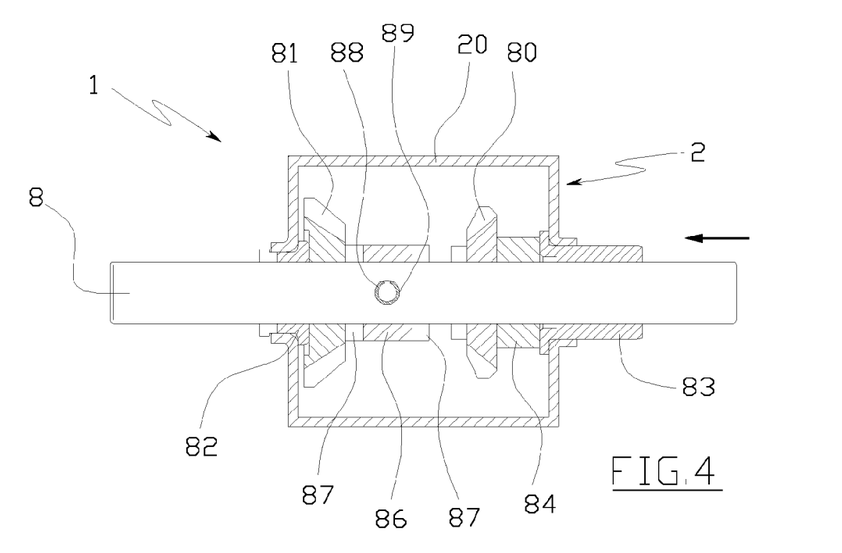
FIG. 4 is section IV-IV of FIG. 2.
Figure 5:
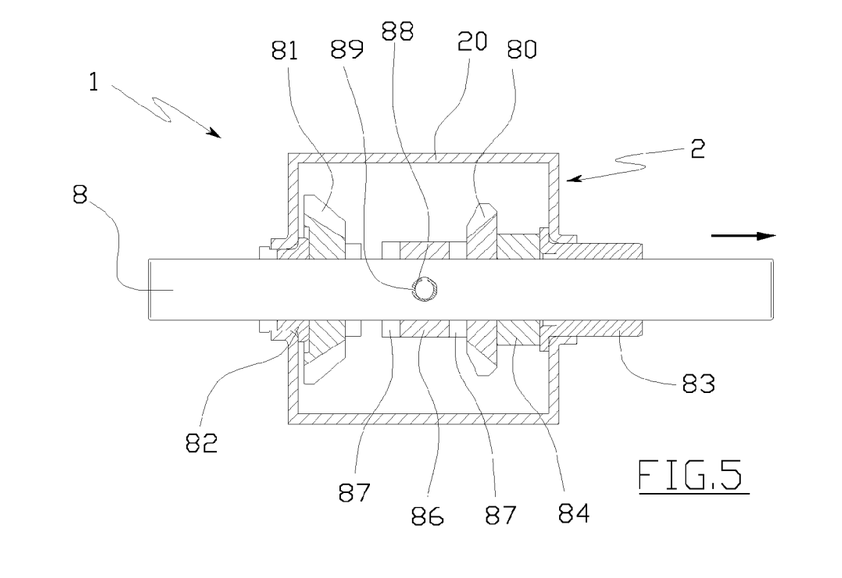
FIG. 5 is section V-V of FIG. 3.

As illustrated in FIGS. 4 and 5, the annular cursor 86 can slide forwards and backwards together with the drive shaft 8, in order to couple alternatively with the gear wheel 80 or the gear wheel 81.

It is also possible to arrest the cursor 86 in an intermediate idle position, in which it is coupled neither with the gear wheel 80 nor with the gear wheel 81.

The displacement of the drive shaft 8 and the relative annular cursor 86 can be obtained manually or by special automatic means of known type and not illustrated.

In this way, the annular cursor 86 together with the gear wheels 80, 81 and the gear wheel 7 establishes a mechanical gear change between the horizontal drive shaft 8 and the vertical manoeuvring screw 5, without there being any need for another intermediate rotating shaft.

As illustrated in FIG. 1, the support leg 1 is provided with a handle 9 which is fixed to an end of the drive shaft 8 which projects from the external tube 20, such as to able to be gripped and manually activated to cause rotation of the drive shaft 8 itself.

The handle 9 can be replaced by any other manual or automatic activating organ, among which for example an electric motor.

In general terms, the rotation of the drive shaft 8 is transmitted via the gears of the gear change to the manoeuvring screw 5 which, thanks to the threaded volute 4, transforms it into an axial movement of the internal tube 21 in the external tube 20 and thus into an extension or retraction of the support leg 1.

In more detail, when the annular cursor 86 is engaged with the gear wheel 80 as illustrated in FIGS. 3 and 5, the transmission of drive between the drive shaft 8 and the manoeuvring screw 5 is done through the enmeshing of the gear wheel 80 and the internal cogged crown wheel 70.

In this configuration, the gear wheel 81 rotates idle on the drive shaft 8 in the opposite direction to the gear wheel 80, drawn by the cogged crown wheel 71.

The larger transmission ratio existing between the gear wheel 80 and the cogged crown wheel 70 enables the support leg to be extended or retracted rapidly, i.e. making the drive shaft 8 perform a smaller number of rotations.

When the annular cursor 86 is enmeshed with the gear wheel 81 as illustrated in FIGS. 2 and 4, the transmission of the motor between the drive shaft 8 and the manoeuvring screw 5 occurs via the enmeshment between the gear wheel 81 and the external cogged crown wheel 71.

The gear wheel 80 rotates idle on the drive shaft 8 in an opposite direction with respect to the cogged crown wheel 81, drawn by the cogged crown wheel 70.

The smaller transmission ratio between the gear wheel 81 and the cogged crown wheel 71 enables the support leg 1 to be extended or retracted with less effort, i.e. with a smaller torque applied on the drive shaft 8 given a same load applied on the support leg 1.

For reasons of greater clarity, in the following the use of the support leg 1 is described herein below.

The support leg 1 is initially in the configuration shown in FIG. 1, in which the external tube 20 is fixed to a vehicle and the internal tube 21 is raised from the ground.

In order to stabilise the vehicle on the ground, the support leg 1 is subjected to a first extension, up to bringing the platform 3 into contact with the ground, and then to a further second extension, such as at least partially to raise the load.

During the first extension, the support leg 1 is not subjected to the load.

The gear change is brought into the configuration of FIG. 3, such that the greater transmission ratio between the gear wheel 80 and the cogged crown wheel 81 enables the platform 3 to be quickly lowered.

During the second extension, the support leg 1 is subjected to the load.

The gear change is displaced into the configuration of FIG. 2 such that the lower transmission ratio between the gear wheel 81 and the cogged crown wheel 71 enables the load to be raised by applying a relatively small torque on the drive shaft 8.

Note that since the gear wheels 80 and 81 always rotate in different directions, in order to obtain the second extension the drive shaft 8 has to be rotated in an opposite direction with respect to the first extension stage.

To free the vehicle, the support leg 1 is subjected to a first retraction, up to when it rests its load completely on the drive shaft, and then to a second further retraction, such as to return the platform 3, also known as a base, into the initial position of FIG. 1.

During the first retraction, the support leg 1 is still subjected to the load.

For this reason, the gear change is left in the configuration of FIG. 2, such that the smaller transmission ratio between the gear wheel 81 and the cogged crown wheel 71 enables the load to be lowered by applying a relatively small torque to the drive shaft 8.

Naturally, in order to lower the load it will be necessary to rotate the drive shaft 8 in the opposite direction with respect to the preceding stage, given that the gear change stays in the same operating configuration.

During the second retraction, the support leg 1 is no longer subjected to the load.

The gear change can therefore be returned into the configuration of FIG. 3, such that the greater transmission ratio between the gear wheel 80 and the cogged crown wheel 70 enables the platform 3 to be quickly raised.

Figures 6, 7:
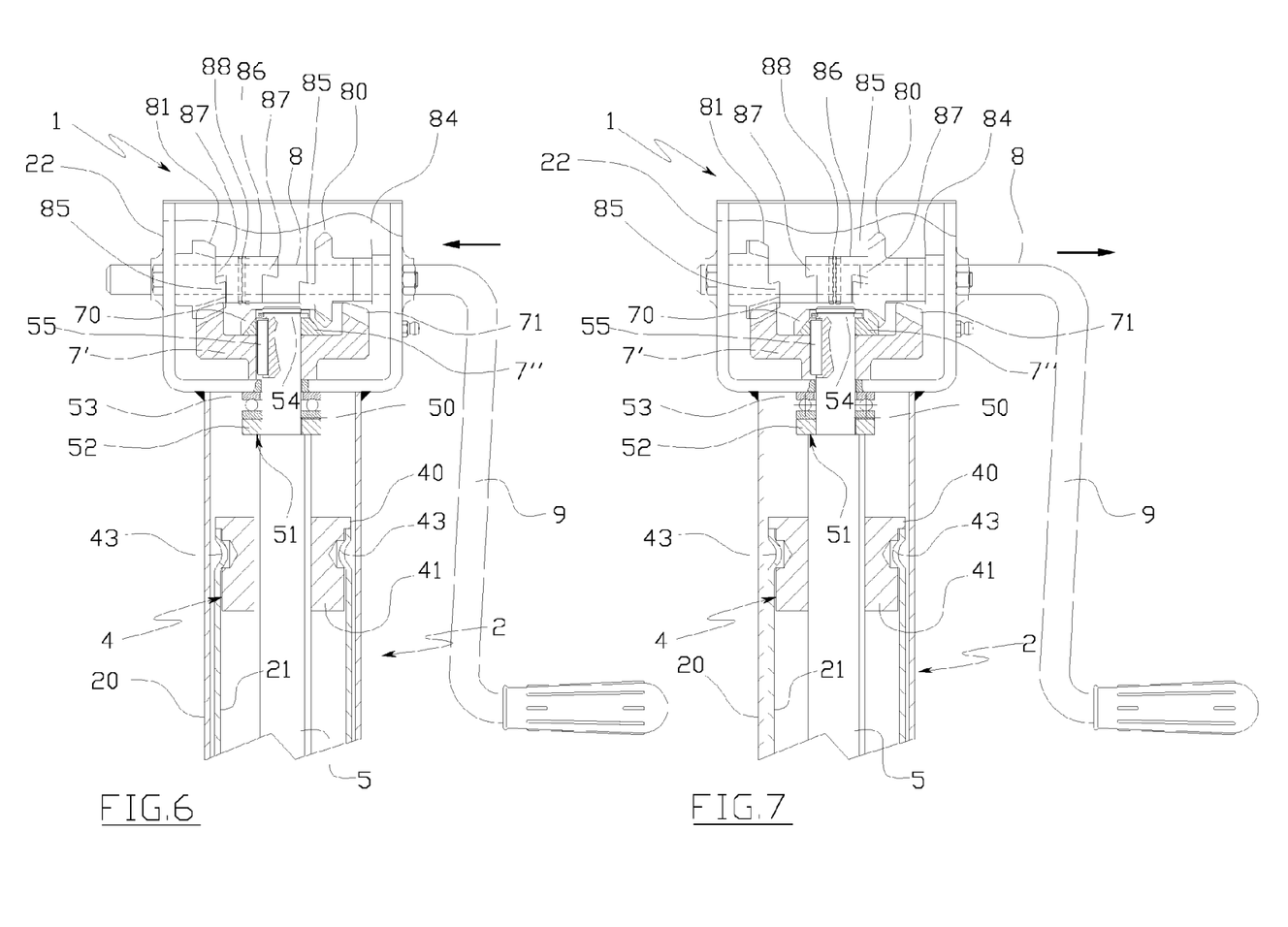
FIGS. 6 and 7 are FIGS. 2 and 3 relating to a further embodiment of the invention.

In FIGS. 6 and 7 a support leg 1 is illustrated which shows a second embodiment of the invention.

This second embodiment is structurally and functionally similar to the preceding one, and differs from it only in some constructional aspects, the most important of which are delineated in the following.

Firstly, the gearings 80, 81, 70, 71 of the gear change are contained internally of a separate casing 22 which is welded to the top of the external tube 20.

The bottom wall of the casing 22 replaces the plate 6 in the first embodiment, and the drive shaft 8 is inserted internally of the holes which are afforded in the lateral walls of the casing 22.

No plastic bushing is provided between the drive shaft 8 and the respective holes.

The gear wheel 81 is therefore directly rested against a lateral wall of the casing 22, while the gear wheel 80 is rested against the opposite lateral wall with only the interposing of a spacer 84.

The activating handle 9 is fashioned in a single body with the drive shaft 8.

The external cogged crown wheel 71 and the internal cogged crown wheel 70 are realised in two separate bodies 7' and 7", which are coaxially inserted on the tract of cylindrical spur 50 which projects internally of the casing 22.

Naturally the external cogged crown wheel 71 and the internal cogged crown wheel 70 could in this case too be realised in a single body as in the preceding embodiment.

The external cogged crown wheel 71 and the internal cogged crown wheel 70 are made solid in rotation with the cylindrical spur 50 by means of a single tab 55 or other constraining system.

The internal tube 21 is constrained to the threaded volute 4, realising series of swellings 43 by plastic deformation, which swellings 43 engage in respective recesses afforded in the threaded volute 4, thus eliminating the need for the transversal pins 42.

Obviously a technical expert in the sector might bring numerous modifications of a technical-applicational nature to the support leg 1, without its forsaking the ambit of the invention as claimed herein below.

The invention claimed is:
1. An extensible support leg comprising at least two reciprocally-slidable portions (20, 21), a maneuvering screw (5) axially constrained to a first portion (20) of the portions (20, 21), a threaded volute (4) axially constrained to a second portion (21) of the portions (20, 21) and screwed on the maneuvering screw (5), and a rotating drive shaft (8) which is connected to the maneuvering screw (5) by means of a mechanical gear change (70, 71, 80, 81, 86), and is destined to be rotated in order to set the maneuvering screw (5) in rotation, the mechanical gear change (70, 71, 80, 81, 86) further comprises:
- two first cogged crown wheels (70, 71), coaxial and rotatably solid with the maneuvering screw (5);
- two second cogged crown wheels (80, 81) mounted coaxially and rotatably idle on the drive shaft (8), each of which enmeshes directly with a respective cogged crown wheel of the first cogged crown wheels (70, 71), such as to realize two gears having different transmission ratios, and
- a cursor (86), which is rotatably solidly associated to a portion of the drive shaft (8) comprised between the second cogged crown wheels (80, 81), and is mobile, in a direction of the axis of the drive shaft (8), between a first enmeshed position and a second enmeshed position, in which the drive shaft (8) is rotatably solid respectively with one of the second cogged crown wheels (80) and with the other (81).

2. The support leg of claim 1, wherein the support leg comprises exactly one rotating shaft, connected in a kinematic mechanism with the maneuvering screw (5), the rotating shaft being the drive shaft (8).

3. The support leg of claim 1, wherein the cursor (86) is axially blocked on the drive shaft (8), which is mobile in the direction of the axis thereof such as to move the cursor (86) between the enmeshed positions.

4. The support leg of claim 1, wherein the cursor (86) comprises opposite lateral sides, each of which is provided with at least a frontal cog (87) configured to couple with at least a frontal cog (85) of the second cogged crown wheel (80, 81) facing it, in order to realize an enmeshment.

5. The support leg of claim 1, wherein the first cogged crown wheels (70, 71) are made in a single body (7) or in two separate bodies.

6. The support leg of claim 1, further comprising a handle (9) configured to be manually activated in order to set the drive shaft (8) in rotation.

7. The support leg of claim 6, wherein the handle (9) is fashioned in a single body with the drive shaft (8).

8. The support leg of claim 1, wherein the drive shaft (8) can be connected to a motor for setting the drive shaft (8) in rotation.

9. The support leg of claim 1, wherein the cursor (86) is associated to an automatic device that moves the cursor (86) between the enmeshed positions.

* * * * *